United States Patent [19]
Deutsher

[11] 3,803,972
[45] Apr. 16, 1974

[54] FASTENERS
[75] Inventor: Keith Mills Deutsher, Beaumaris, Australia
[73] Assignee: Illinois Tool Works Inc., Chicago, Ill.
[22] Filed: Aug. 24, 1972
[21] Appl. No.: 283,451

[30] Foreign Application Priority Data
Sept. 1, 1971 Australia.............................. 6134/71

[52] U.S. Cl..................................... 85/1 JP, 85/9 R
[51] Int. Cl....................... F16b 23/00, F16b 35/00
[58] Field of Search......... 85/9 R, 53, 55, 1 JP, 1 C, 85/37 R, 35, 32 R, 47

[56] References Cited
UNITED STATES PATENTS
| | | |
|---|---|---|
| 2,917,819 | 12/1959 | Britton et al..................... 85/1 JP X |
| 3,060,112 | 10/1962 | Shomber.......................... 85/1 R X |
| 3,364,806 | 1/1968 | Chaiver............................. 85/55 X |
| 3,566,738 | 3/1971 | Cupit.................................. 85/1 JP |
| 3,585,894 | 6/1971 | Brown............................. 85/1 JP X |

Primary Examiner—Ramon S. Britts
Attorney, Agent, or Firm—Robert W. Beart; J. R. Halvorsen

[57] ABSTRACT

The invention provides a screw fastener having at one end a head which is at least partly enclosed in a capping of a different material compatible electrolytically with the metal to be secured by the screw fastener, such that there is no direct contact between the screw fastener and that metal but rather contact between the metal and the capping, whereby electrolytic corrosion will be substantially reduced.

7 Claims, 5 Drawing Figures

PATENTED APR 16 1974 3,803,972

FASTENERS

DESCRIPTION

The invention refers particularly to screw fasteners for securing aluminum alloy roofing or wall cladding.

It has been a problem with fasteners used for fastening in position aluminum or aluminum alloy sheeting that electrolytic corrosion results between steel fasteners — even zinc or cadmium plated steel fasteners — and such sheeting. This is particularly the case with the head portion of the fastener and the shank of the fastener immediately adjacent the alloy sheeting. In order to overcome the problem of electrolytic corrosion it has been proposed that austenitic stainless steel and/or aluminum alloy fasteners be used. This partly overcomes the problem of corrosion but limits the type of fastener to be used, and rules out the use of heat treated steel fasteners of the self-drilling and thread forming types, the use of which leads to saving in erection time and cost.

It is an object of this invention to provide a solution to the problem of corrosion in the use of ferrous fasteners for securing in position aluminum alloy sheeting.

Another object is to provide a screw, bolt or equivalent fastener made of one metal and for use in association with a different metal wherein the effect of electrolytic corrosion as between that fastener and the metal will be greatly reduced.

According to this invention there is provided a fastener having a shank and a head, and wherein the head is at least partly enclosed in a cap member operative to prevent direct contact between the head and a metal member to be secured by the fastener, the cap member being of a material such that electrolytic corrosion between the capped head and the metal member will be substantially less than would be electrolytic corrosion between the uncapped head and the metal member.

According to another aspect of the invention there is provided a fastener having a head for engagement by a fastening tool, and a capping member engaged on said head so as to be capable of engagement by the fastening tool to effect operation of the fastener, the capping member being electrolytically compatible with a metal member to be secured in position by the capped fastener and being so disposed on the head as to prevent direct contact between the head and the metal member.

Thus, for fastening in position sheets of aluminum alloy, such as roofing sheets and wall cladding, the capping member is made of an aluminum alloy of substantially the same electrostatic potential as the aluminum alloy sheets. The capping member should be of a thickness as to withstand corrosion as between the head and the cap for a substantial period of time, and it is preferred that the parts of the fastener in contact with the capping member be plated with a material having an electrolytic potential as close as conveniently possible to that of the capping member so as to reduce corrosion so far as possible.

In order that the invention may be clearly understood and readily put into practical form I shall now describe with reference to the accompanying drawings a preferred construction of capped head screw assembly made according to the invention.

Figure 1:
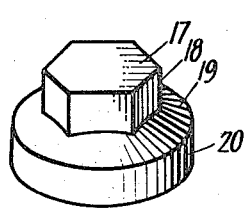
FIG. 1 is a perspective view of a screw and of a cover piece or capping for engagement over the head of the screw.
Figure 1:
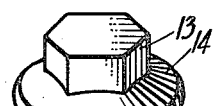
Figure 1:
Figure 2:
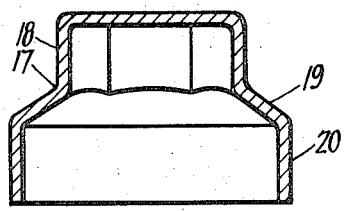
FIG. 2 shows the screw and the capping partly in elevation and partly in cross-section.
Figure 2:
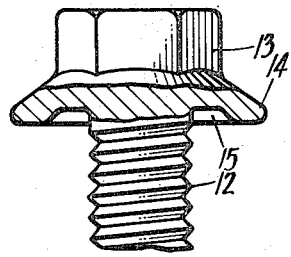

The screw 11 forming part of the assembly may be of any desired type and is not necessarily a self-drilling, thread-cutting screw as illustrated. The screw 11 has a shank 12 with a hexagonal head 13 at one end and inwardly of the head an integral skirt or circumferential flange which is recessed at 15 on its underside.

The cover piece or capping 17 is made to fit on the headed part of the screw 11, having a part 18 of hexagonal cross-sectional shape and an internal size to accommodate the head 13 of the screw in such manner that when a spanner is applied to the outer surface of the part 18 to grip it and cause it to rotate there will be caused at the same time a rotation of the screw 11. Thus, there should be such a fit of the head 13 in the part 18 that the capping 17 can be readily fitted on to the screw head 13 but there is only a very small rotational movement of the screw head 13 in the capping part 18.

The capping 17 also has a circumferential flange 19 and a downwardly extending skirt 20 within which will be accommodated the circumferential flange 14 of the screw 11. The skirt 20 is of such length that when the screw head 13 and flange 14 are fitted in the capping 17 the skirt 20 of the capping may be swaged inwardly to extend below the flange 14 and into the recessed portion 25, as is shown at 21 in FIGS. 3, 4 and 5.

Figure 3:
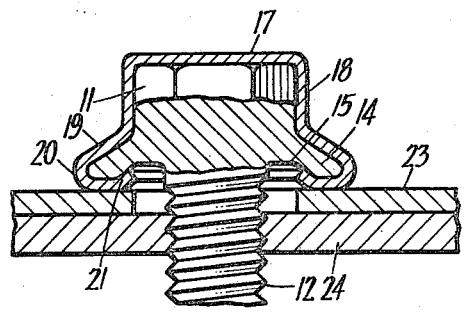
FIG. 3 is a view of the assembly operative to fasten together two sheets of material.

The screw 11 may be made of steel and be zinc or cadmium plated, and the capping 17 may be made of aluminum alloy, so that when the assembly is applied to fasten in position an aluminum alloy sheet 23 on to a support 24 the only direct contact between the fastening means and the aluminum alloy sheet is by the aluminum alloy capping 17, as is quite clear from FIG. 3. It is also to be noted that in the application of the screw assembly the fastening tool — a spanner — does not engage the plated head 13 of the screw 11 but, rather, engages the capping part 18. Thus, there is no real likelihood of damage to the head 13 or the protective plating thereon.

It will also be appreciated that the aluminum alloy capping 17 may be made the same colour as the aluminum alloy sheet 23 to which it is to be attached.

Figure 4:
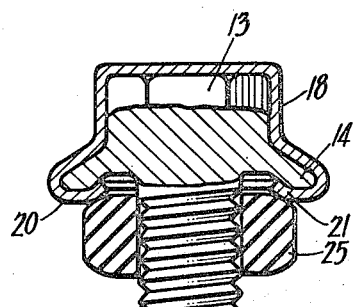
FIG. 4 shows the assembly with a resilient washer on the screw.
Figure 5:
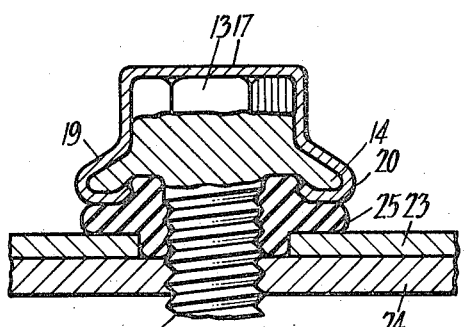
FIG. 5 illustrates the assembly of FIG. 4 used to fasten two sheets of material in position.

As shown in FIGS. 4 and 5 a resilient sealing washer 25 is fitted to the shank 12 of the screw 11 so as to bear against the underside of the capped screw head and complete the covering of the plated steel head 13 of the screw 11. When the screw 11 having the washer 25 fitted to it is engaged with a support 24 so as to fasten in position an aluminum sheet 23 the elastomeric material of the washer 25 will tend to fill spaces through which moisture or dust might otherwise penetrate so as to effect a good sealing of the opening through the sheet 23. This also prevents any exposure of the plated head of the screw 11.

It will be appreciated that the invention may be applied to other forms of cap, and to other materials where there is a likelihood of strong electrolytic corrosion. Thus, the head of the screw may be of square shape instead of hexagonal, and if the fastener is to be used in association with a magnesium alloy the cap may be made of a magnesium alloy or other material electrostatically compatible with that metal.

I claim:

1. A screw type fastener having a threaded shank and a head which includes a circumferential flange, the undersurface of the flange including a clamping surface extending on a plane which is normal to the axis of the shank, the head also including polygonal tool accommodating rotation producing surfaces, the fastener being of a ferrous heat treatable material, a cap member of a size and shape complementary to the head and encapsulating the head so rotation inducing forces applied directly to the cap will rotate the fastener without appreciable relative rotation between the cap and the fastener, the cap member including a circumferential skirt fitting around, underlying and locked beneath the clamping surface of the flange to prevent any direct surface contact between a complementary workpiece and the fastener head and, thus, sealingly enclosing the head from the atmosphere, the undersurface of the flange also including an annular recessed portion spaced radially inwardly from the circumferential edge of the flange and merging with the clamping surface, the inner periphery of the skirt portion of the cap extending into and engaging the recessed portion to lockingly retain the cap on the head. the cap member being of a material different from that of the fastener and being electrolytically compatible with the complementary metal workpiece so that the electrolytic corrosion between the cap head and metal workpiece will be substantially less than would be the electrolytic corrosion between the uncapped head and metal workpiece.

2. A fastener according to claim 1 wherein the shank has a drill end and a thread forming formation on the shank.

3. A fastener according to claim 1 wherein the head portion at least of the fastener is plated with a suitable metallic plating and the cap member is of aluminum alloy of substantially the same electrostatic potential as the metal member with which it is to be engaged.

4. A screw type fastener in accordance with claim 1, wherein the cap member is aluminum.

5. A screw type fastener in accordance with claim 1, wherein the cap member is a stainless steel material.

6. A screw type fastener in accordance with claim 1, wherein the cap member is a magnesium material.

7. A screw type fastener in accordance with claim 1, wherein a resilient sealing washer member is associated with the fastener to generally fill the recess portion when the fastener is clamped to an associated workpiece.

* * * * *